United States Patent
Yamada et al.

(10) Patent No.: US 7,064,966 B2
(45) Date of Patent: Jun. 20, 2006

(54) SWITCHING DC POWER SUPPLY

(75) Inventors: Tomoyasu Yamada, Niiza (JP);
Mitsugu Furuya, Niiza (JP)

(73) Assignee: Sanken Electric Co., Ltd. (JP)

( * ) Notice: Subject to any disclaimer, the term of this patent is extended or adjusted under 35 U.S.C. 154(b) by 0 days.

(21) Appl. No.: 11/077,434

(22) Filed: Mar. 10, 2005

(65) Prior Publication Data

US 2005/0248965 A1    Nov. 10, 2005

(30) Foreign Application Priority Data

Mar. 12, 2004   (JP)   ............................. 2004-070945

(51) Int. Cl.
*H02M 3/335* (2006.01)
(52) U.S. Cl. ................. 363/21.16; 363/21.18
(58) Field of Classification Search ................. 363/20, 363/21.01, 21.04, 21.07, 21.08, 21.1, 21.11, 363/21.12, 21.15, 21.16, 21.18, 97, 131
See application file for complete search history.

(56) References Cited

U.S. PATENT DOCUMENTS

| 6,445,598 B1 * | 9/2002 | Yamada | 363/21.12 |
| 6,519,165 B1 * | 2/2003 | Koike | 363/21.12 |
| 6,646,894 B1 * | 11/2003 | Hong et al. | 363/21.01 |
| 6,972,970 B1 * | 12/2005 | Yamada | 363/21.16 |

FOREIGN PATENT DOCUMENTS

| JP | 2002-051549 | 2/2002 |
| JP | 2002-171760 | 6/2002 |

* cited by examiner

*Primary Examiner*—Gary L Laxton
(74) *Attorney, Agent, or Firm*—Woodcock Washburn LLP

(57) ABSTRACT

A transformer has a primary winding connected between a pair of dc input terminals via a voltage regulator switch, and a secondary winding connected between a pair of dc output terminals via a rectifying and smoothing circuit. The dc output voltage being applied to the load from the dc output terminals is detected, and the detector output voltage dually divided, to provide two feedback signals of different magnitudes. One of these feedback signals is used by a mode selector circuit to provide a mode select signal for causing the voltage regulator switch to be driven continuously under normal load, and at intervals under light load. Delivered to a conduction terminator circuit, the other feedback signal is thereby used to provide conduction terminator pulses for terminating conduction through the voltage regulator switch. A conduction initiator circuit responds both to the mode select signal and to a signal indicative of the conduction and nonconduction of the voltage regulator switch, to initiate conduction therethrough upon lapse of a preassigned length of time following the end of the previous conducting period. Although the nonconducting periods of the voltage regulator switch are thus fixed, its conducting periods are variable with the results of comparison of a switch current detect signal and the second recited feedback signal.

9 Claims, 10 Drawing Sheets

SWITCHING DC POWER SUPPLY

CROSS REFERENCE TO RELATED APPLICATIONS

This application claims priority to Japanese Patent Application No. 2004-070945, filed Mar. 12, 2004.

BACKGROUND OF THE INVENTION

This invention relates generally to switching dc power supplies, known also as dc-to-dc converters or switching regulator, and more particularly to such a power supply capable of providing a constant dc output voltage by negative feedback. Still more particularly, the invention pertains to a dual-mode switching power supply wherein the voltage regulator switch for holding the output voltage constant is driven (i.e. turned on and off) continuously under normal load and at intervals under light load, with a view to reduction of switching loss.

The switching power supply of the type herein under consideration generally comprises a transformer having a primary winding connected to a pair of input terminals between which in turn are to be connected to a dc power supply, and a secondary winding connected via a rectifying and smoothing circuit to a pair of output terminals to be connected to a load. Connected in series with the transformer primary, the voltage regulator switch such as a field-effect transistor is driven by a switch control circuit according to the dc output voltage and the magnitude of a current flowing through the switch itself.

One of the problems encountered with the switching power supply outlined above is the power loss, known as switching loss, caused by the on-off operation of the voltage regulator switch. Switching loss must be avoided for higher efficiency of the power supply, particularly when the power requirement of the load is low. Should the voltage regulator switch be driven under light load at a switching frequency that is the same as, or higher than, that under normal load, the resulting switching loss would be too high for the power being consumed.

It has been suggested to overcome this demerit of the switching power supply by driving the voltage regulator switch continuously under normal load (normal load mode) and at intervals under light load (light load mode). Japanese Unexamined Patent Publication Nos. 2002-51549 and 2002-171760 are hereby cited as teaching such dual-mode driving of the voltage regulator switch. The light load mode is intended to make the number of switchings drastically less per unit length of time than when the switch is driven continuously in normal load mode. The reduction of switchings per unit length of time in light load mode is tantamount to the reduction of switching loss and hence to a higher overall efficiency of the converter. A loss in the stability of the output voltage during operation in light load mode is condoned as negligible compared to the merit gained.

Such dual-mode driving of the voltage regulator switch has had some problems left unresolved, however. One of the problems arises from the fact that the switching frequency is fixed. The fixed-frequency driving of the voltage regulator switch leads to the fact that the noise produced by the switching is nearly wholly contained in some specific frequency band, adversely affecting the internal circuits of the power supply or even those external thereto.

Another problem manifests itself in connection with the measurement of the load magnitude as a prerequisite for driving the voltage regulator switch in either normal or light load mode. The two unexamined Japanese patent publications cited above both rely upon the feedback signal indicative of the output voltage being applied to the load. This practice would pose no problem at all if the dc input voltage of the switching power supply were constant. Actually, it is not. It must also be taken into account that the dual-mode power supply is put to use in both 100- and 200-volt environment.

Generally, in dc-to-dc converters designed to hold the output voltage constant, the voltage level of the feedback signal changes in inverse proportion to the input voltage. The feedback signal does not, therefore, necessarily provide an almighty measure of the load magnitude.

SUMMARY OF THE INVENTION

It is therefore an object of the instant invention to drive the voltage regulator switch at variable frequencies in both normal load and light load mode in order to cause dispersion of the noise frequencies with a view to minimal interference with circuits that are either internal or external to the switching power supply.

Another object of the invention is to make the switching power supply higher in efficiency in driving the voltage regulator switch in the two different modes.

Still another object of the invention is to simplify the circuit configuration required for selectively driving the switch in the two different modes.

Briefly, the invention may be summarized as a dual-mode, variable-frequency switching dc power supply capable of operation in either normal load mode or light load mode depending upon the power requirement of the load connected thereto. The switching power supply comprises inductance means such as a transformer or reactor connected on one hand to dc input means for inputting a dc input voltage and, on the other hand, to dc output means via a rectifying and smoothing circuit for application of a dc output voltage to the load. A voltage regulator switch is connected to the dc input means via the inductance means for switching the dc input voltage being applied to the inductance means.

Employed for controlling the on-off operation of the voltage regulator switch is a switch control circuit comprising, first of all, a switch control pulse generator circuit which generates switch control pulses for driving the voltage regulator switch, A mode selector circuit, another component of the switch control circuit, generates a mode select signal by comparing a feedback signal indicative of the dc output voltage and at least one, preferably two, reference values. The mode select signal has a first state (e.g. low) for permitting the switch control pulse generator circuit to drive the voltage regulator switch, and a second state (e.g. high) for preventing the switch control pulse generator circuit from driving the voltage regulator switch. (In the preferred embodiments to be presented subsequently, the mode select signal is continuously low in normal load mode, and alternately high and low in light load mode.)

The switch control circuit further comprises a conduction initiator circuit and conduction terminator circuit, both connected to the control pulse generator circuit to determine the beginnings and ends, respectively, of the conducting periods of the voltage regulator switch. The conduction terminator circuit is connected between the feedback circuit means and the switch control pulse generator circuit for applying conduction terminator pulses to the latter in order to cause the switch control pulse generator circuit to terminate conduction through the voltage regulator switch as dictated by the feedback signal. The conduction initiator circuit on the other hand applies conduction initiator pulses to the voltage control pulse generator circuit in order to cause the same to initiate conduction through the voltage regulator switch upon lapse of a preassigned length of time following the termination of each conducting period of the voltage regulator switch. Further the conduction initiator circuit has an input connected to the mode selector circuit in order to be thereby prevented from applying the conduction initiator pulses to the switch control pulse generator circuit when the mode select signal is in the second state, and to resume application of the conduction initiator pulses to the switch control pulse generator circuit upon lapse of the preassigned length of time following the end of the second state of the mode select signal.

Such being the improved construction of the switching power supply according to the invention, the voltage regulator switch has its conducting periods varied with the variable power requirement of the load as manifested by the dc output voltage, but has its nonconducting periods held unchanged. In short the switching frequency varies with the load. In light load mode, moreover, in which the voltage regulator switch is driven at intervals, each nonconducting period of the switch while it is being driven is of the same duration as that in normal load mode. The switching frequency is therefore not to rise so much as to cause an unnecessarily great switching loss in relation to the power being consumed. Furthermore, since the switching frequency is variable in both normal and light load mode, the noise frequency is dispersed for less interference with associated circuits.

The above and other objects, features and advantages of this invention will become more apparent, and the invention itself will best be understood, from a study of the following description and appended claims, with reference had to the attached drawings showing some preferable embodiments of the invention.

DESCRIPTION OF THE PREFERRED EMBODIMENTS

Figure 1:
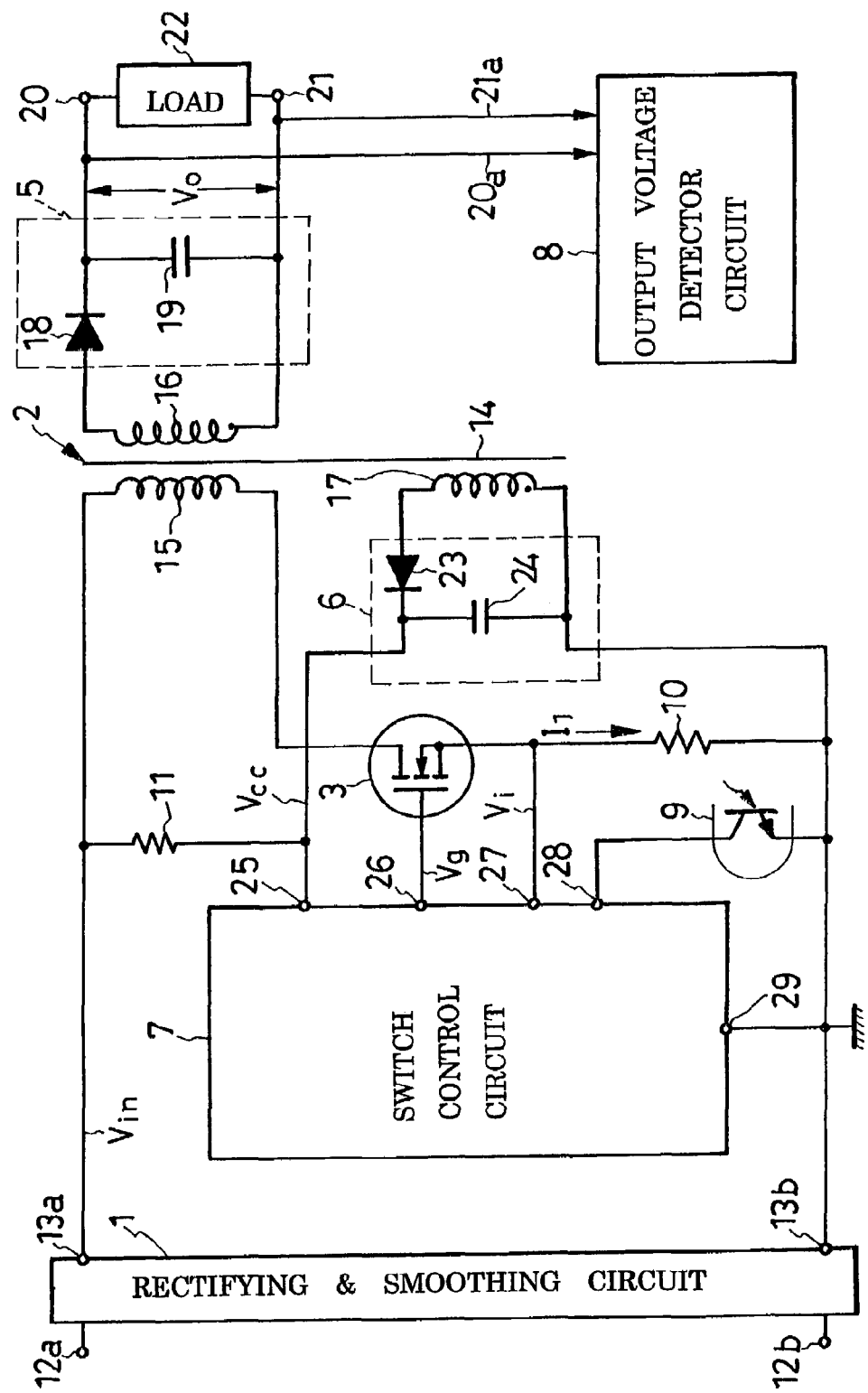
FIG. 1 is a schematic electrical diagram, partly in block form, of a first preferred form of dual-mode, variable-frequency switching dc power supply embodying the principles of this invention.

The present invention is currently believed to be best embodied in the dual-mode, variable-frequency switching power supply or switching regulator depicted in its entirety in FIG. 1 of the drawings above. The representative switching power supply, incorporating a dc-to-dc converter, broadly comprises:

1. A first or input rectifying and smoothing circuit 1 having a pair of ac input terminals $12_a$ and $12_b$ to be connected to an ac power supply, not shown, and a pair of dc output terminals $13_a$ and $13_b$ for providing a dc input voltage to be controlled by this apparatus.

2. A transformer 2 having a primary winding 15 connected to the input rectifying and smoothing circuit 2, a secondary winding 16 connected to a pair of dc output terminals 20 and 21 which are shown connected to a load 22 to be powered, and a tertiary winding 17.

3. A main or voltage regulator switch 3 connected between the pair of dc output terminals $13_a$ and $13_b$ of the input rectifying and smoothing circuit 1 via the primary winding 15 of the transformer 2.

4. A second or output rectifying and smoothing circuit 5 connected between the secondary winding 16 of the transformer 2 and the pair of dc output terminals 20 and 21.

5. A third rectifying and smoothing circuit 6 connected to the tertiary winding 17 of the transformer 2 for providing dc voltage $V_{cc}$ which is fed to the switch control circuit 7 for powering the constituent circuits thereof.

6. A switch control circuit 7 for controllably driving the voltage regulator switch 3.

7. An output voltage detector circuit 8 as feedback circuit means connected to the pair of dc output terminals 20 and 21 for generating an output voltage detect signal indicative of the dc output voltage $V_o$ being applied to the load 22, the output voltage detect signal being fed back to the switch control circuit 7.

8. A photoreceptor 9 for optically receiving the output voltage detect signal fed back from the output voltage detector circuit 8 preparatory to application to the switch control signal 7.

9. A current detect resistor 10 connected in series with the voltage regulator switch 3 for providing a voltage signal $V_i$ (hereinafter referred to as the voltage regulator switch current detect signal or more simply as the switch current detect signal) indicative of the magnitude of the current flowing through the voltage regulator switch, the switch current detect signal $V_i$ being directed into the switch control circuit 7.

10. A starting resistor 11 connected between the output terminal $13_a$ of the input rectifying and smoothing circuit 1 and the third rectifying and smoothing circuit 6.

The input rectifying and smoothing circuit 1 is of familiar make comprising a rectifying diode circuit and smoothing circuit for providing an unstabilized dc voltage $V_{in}$, subject to fluctuation with the ac input voltage between the pair of ac input terminals $12_a$ and $12_b$. The pair of dc output terminals $13_a$ and $13_b$ of this input rectifying and smoothing circuit 1 may be sometimes referred to as the dc input terminals, and the dc output voltage $V_{in}$ thereof as the dc input voltage, for the purposes of the invention. The second dc input terminal $13_b$ is grounded.

The unshown ac power supply could be of three phases, in which case a three-phase rectifying and smoothing circuit might be employed. The input rectifying and smoothing circuit 1 could also be replaced by a known ac-to-dc converter circuit capable of power factor improvement, or by a dc power supply such as a battery.

The transformer 2 has all its three windings 15–17 coiled upon a magnetic core 14 and electromagnetically coupled to one another. These transformer windings 15–17 are polarized as indicated by the dots in FIG. 1. It is thus seen that the secondary 16 and tertiary 17 are opposite in polarity to the primary 15.

Shown as an insulated-gate field-effect transistor (IGFET), the voltage regulator switch 3 is connected in series with the transformer primary 15. The IGFET is capable of switching by application of driving pulses to its gate, the control terminal, which in FIG. 1 is shown connected to the switch control circuit 7. Other types of electronically controllable switches, including transistors such as insulated-gate bipolar transistors, could be employed in substitution for the IGFET shown. The dc input voltage is impressed to the transformer primary 15 when the voltage regulator switch 3 is the conduction state.

The output rectifying and smoothing circuit 5 comprises a rectifying diode 18 and smoothing capacitor 19. The smoothing capacitor 19 is connected in parallel with the transformer secondary 16 via the rectifying diode 18, besides being connected between the pair of dc output terminals 20 and 22. The rectifying diode 18 is oriented to conduct during the nonconducting periods of the voltage regulator switch 3.

The third rectifying and smoothing circuit 6, which provides a dc supply voltage $V_{cc}$ for feeding the switch control circuit 7, likewise comprises a rectifying diode 23 and smoothing capacitor 24. The smoothing capacitor 24 is connected in parallel with the transformer tertiary 17 via the rectifying diode 23. The rectifying diode 23 is oriented to conduct during the nonconducting periods of the voltage regulator switch 3.

With the current detect resistor 10 is connected in series with the voltage regulator switch 3, there is formed a serial circuit of a transformer primary 15, voltage regulator switch 3 and current detect resistor 10 between the pair of dc input terminals $13_a$ and $13_b$. Since the transformer primary 15 is inductive, the current flowing through the transformer primary rises with a gradient in magnitude during each conducting period of the voltage regulator switch 3 and drops to zero upon nonconduction of the switch. Therefore, as the voltage regulator switch 3 is repeatedly driven on and off, a current $I_1$ of sawtoothed waveform flows through the current detect resistor 10. The aforesaid voltage regulator switch current detect signal $V_i$ of sawtoothed waveform is thus obtained for application to the input 27 of the switch control circuit 7.

Figure 2:
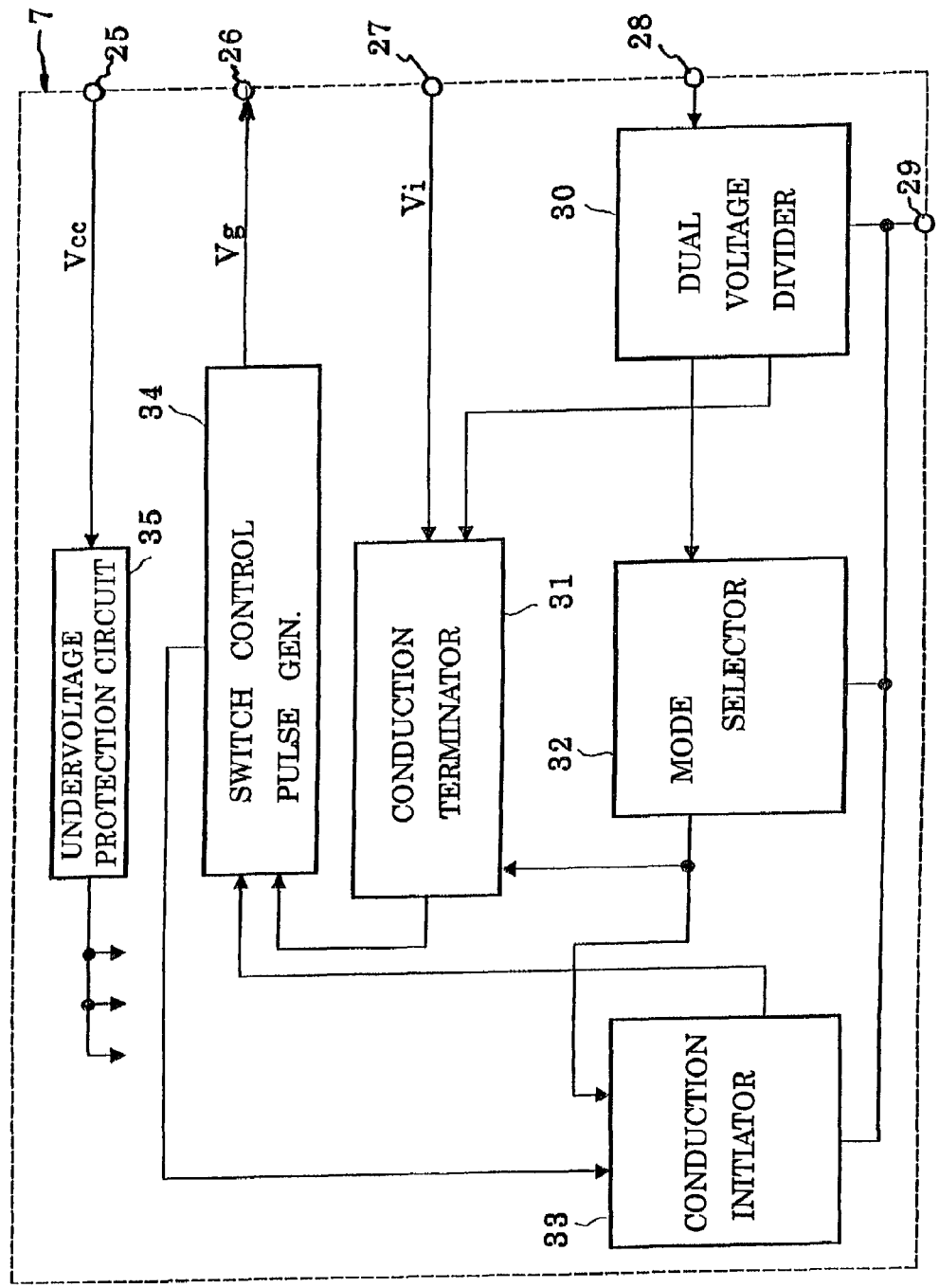
FIG. 2 is a block diagram showing in more detail the switch control circuit included in the switching power supply of FIG. 1.

For controllably driving the voltage regulator switch 3 as taught by this invention, the switch control circuit 7 comprises the circuits indicated in block form in FIG. 2, to which reference will be had presently. All these constituents of the switch control circuit 7 may be integrated in the practice of the invention. In FIG. 1, however, the switch control circuit 7 is merely shown as having the following five terminals:

1. A supply terminal 25 connected to the smoothing capacitor 24 of the third rectifying and smoothing circuit 6, to which is also connected the first dc input terminal $13_a$ via the starting resistor 11. This capacitor 24 is therefore charged via the starting resistor 11 prior to the commencement of normal operation of the voltage regulator switch 3.

2. A switch control pulse output terminal 26 connected to the control terminal of the voltage regulator switch 3. Switch control pulses are applied to this switch for turning the same on and off.

3. A current detect signal input terminal 27 connected to the junction between voltage regulator switch 3 and current detect resistor 10 for inputting the switch current detect signal $V_i$. This signal $V_i$ has a voltage in proportion with the current $I_1$ flowing through the transformer primary 15 and voltage regulator switch 3.

4. A feedback input terminal 28 connected to the grounded second dc input $13_b$ via the photoreceptor 9. Shown as a phototransistor, the photoreceptor 9 is positioned to be irradiated by a light source (seen at 40 in FIG. 3) included in the output voltage detector circuit 8. The output voltage detect signal thus fed from the output voltage detector circuit 8 back to the switch control circuit 7 enables the latter to control the voltage regulator switch 3 according to the dc output voltage $V_o$ being applied to the load 22.

5. A ground terminal 29 connected to the second dc input $13_b$

With reference to FIG. 2 the switch control circuit 7 broadly comprises:

1. A dual voltage divider circuit 30 for dually voltage-dividing the output voltage detect signal fed back from the output voltage detector circuit 8 into two feedback signals.

2. A conduction terminator circuit 31 for generating pulses for terminating the conduction of the voltage regulator switch 3.

3. A mode selector circuit 32 responsive to one of the feedback signals from the dual voltage divider circuit 30 for providing a mode select signal indicative of whether the voltage regulator switch 3 is to be driven or not.

4. A conduction initiator circuit 33 for generating pulses for initiating conduction through the voltage regulator switch 3.

5. A switch control pulse generator circuit 34 for on-off control of the voltage regulator switch 3 in response to the output pulses of the conduction terminator circuit 31 and conduction initiator circuit 33.

6. An undervoltage protection circuit 35 for preventing the switch control circuit 7 from malfunctioning when its dc supply voltage becomes abnormally low.

Figure 3:
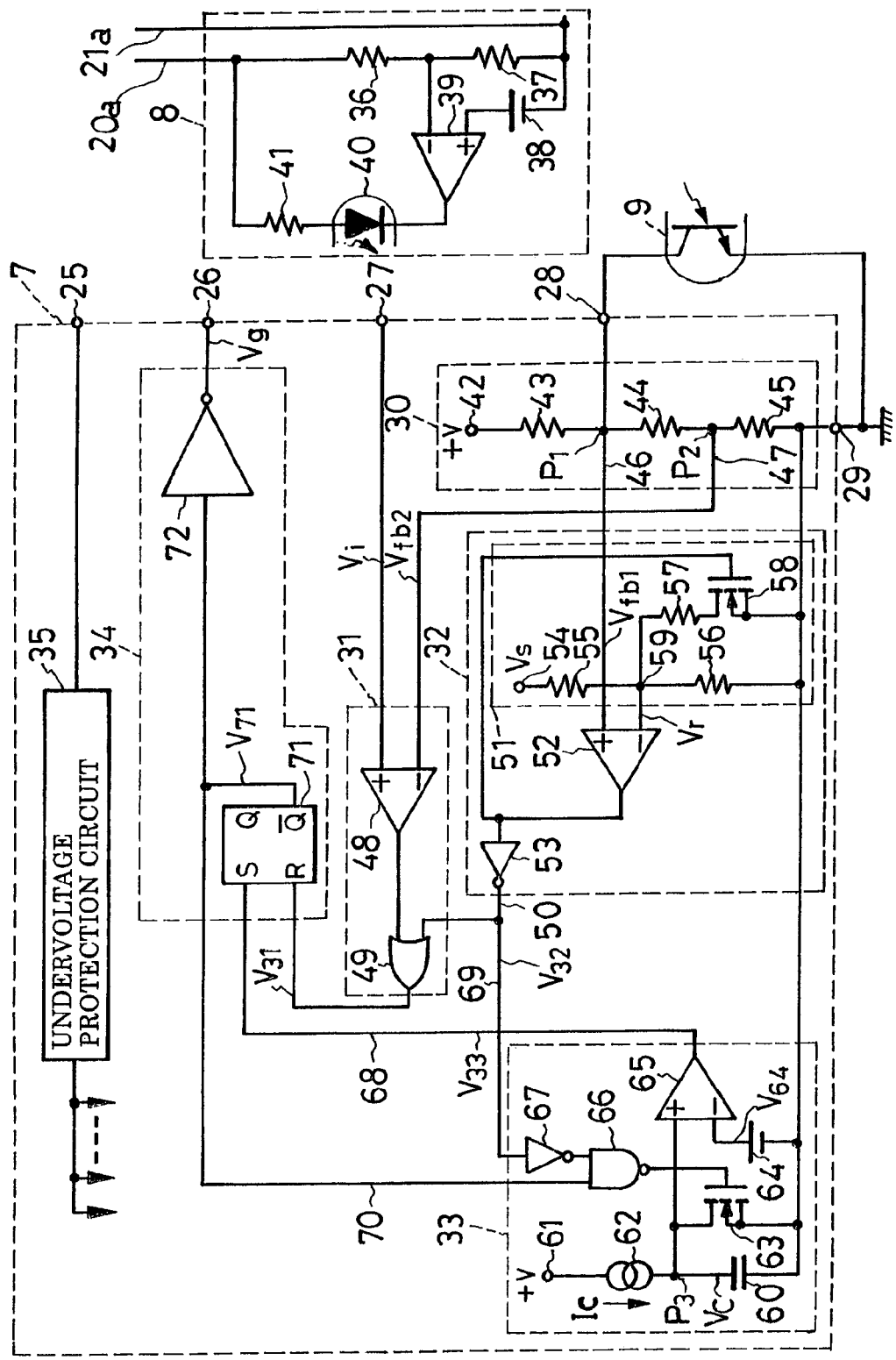
FIG. 3 is a schematic electrical diagram showing in still more detail the switch control circuit of FIG. 2 together with the output voltage detector circuit indicated in block form in FIG. 1.

Reference is now invited to FIG. 3 for a more detailed study of the switch control circuit 7 and output voltage detector circuit 8. Concerning first the output voltage detector circuit 8, this circuit includes a serial connection of two voltage-dividing resistors 36 and 37 which is connected between the pair of dc output terminals 20 and 21, FIG. 1, by way of the conductors 21$_a$ and 21$_b$. The junction between these voltage-dividing resistors 36 and 37 is connected to the negative input of a differential amplifier 39, the positive input of which is connected to a reference voltage source 38, so that the differential amplifier 39 puts out a signal indicative of the difference between a fraction of the dc output voltage $V_o$ and the reference voltage from the source 38. A light-emitting device 40 is connected via a current-limiting resistor 41 between the conductor 20$_a$, over which is delivered the dc output voltage $V_o$, and the output of the differential amplifier 39.

Thus the output voltage of the differential amplifier 39 is in inverse proportion to the dc output voltage $V_o$, and so is the output intensity of the light-emitting device 40 to the output from the differential amplifier 39. The output from the light-emitting device 40 is therefore directly proportional to the dc output voltage $V_o$. The dc output voltage $V_o$ rises with a drop in the power requirement of the load 22, with a proportionate rise in the output intensity of the light-emitting device 40. The optical from the output voltage detector circuit 8, which is on the output side of the transformer 2, is directed to the photoreceptor 9 on the input side of the transformer, thereby to be translated into an electric signal preliminary to application to the switch control circuit 7.

With continued reference to FIG. 3 the switch control circuit 7 includes as aforesaid the dual voltage divider circuit 30 comprising a serial connection of three resistors 43, 44 and 45 connected between a dc supply terminal 42 and the ground terminal 29. The junction $P_1$ between the first and second resistors 43 and 44 is connected both to the photoreceptor 9 via the feedback input 28 and to the mode selector circuit 32 by way of a first output conductor 46. The junction $P_2$ between the second and third resistors 44 and 45 is connected to the conduction terminator circuit 31 by way of a second output conductor 47.

Positioned to be irradiated by the light-emitting device 40 of the output voltage detector circuit 8, the photoreceptor 9 is connected between the input terminal 28 and ground terminal 29 of the switch control circuit 7. The photoreceptor 9 is therefore in parallel with the serial connection of the second and third resistors 44 and 45 and changes in resistivity in inverse proportion to the output intensity of the light-emitting device 40. Accordingly, the feedback circuit means comprises the output voltage detector circuit 8, the photoreceptor 9, and the dual voltage divider circuit 30.

The potential at the junction $P_1$ between the first and second resistors 43 and 44 depends upon the ratio of the resultant of the resistances of the second and third resistors 44 and 45 and photoreceptor 9 to the resistance of the first resistor 43. Thus a higher output voltage $V_o$ leads to a greater output intensity of the light-emitting device 40, which in turn leads to a less resistance of the photoreceptor 9, which in turn leads to a less potential at the junction $P_1$ between the resistors 43 and 44. By the same token, a lower output voltage $V_o$ leads to a higher potential at the junction $P_1$. The potential at the junction $P_2$ between the second and third resistors 44 and 45 is less than that at the junction $P_1$, being a fraction of the latter.

The means employed in this particular embodiment for feedback of the dc output voltage $V_o$ to the switch control circuit 7 are subject to a variety of modifications within the common knowledge of the specialists. For example, the differential amplifier 39 of the output voltage detector circuit 8 might be coupled to the dual voltage divider circuit 30 either electrically or electromagnetically, instead of optically as in this embodiment. Also, the light-emitting device 40 and photoreceptor 9 could be connected in different positions. As a further example, the differential amplifier 39 of the output voltage detector circuit 8 might have its positive input connected to the junction between the resistors 36 and 37, and its negative input to the reference voltage source 38. In this case, though, the output from the light-emitting device 40 would be inversely proportional to the dc output voltage $V_o$, so that the photoreceptor 9 might be connected in series or parallel with the resistor 43 of the dual voltage divider circuit 30.

Figure 4:
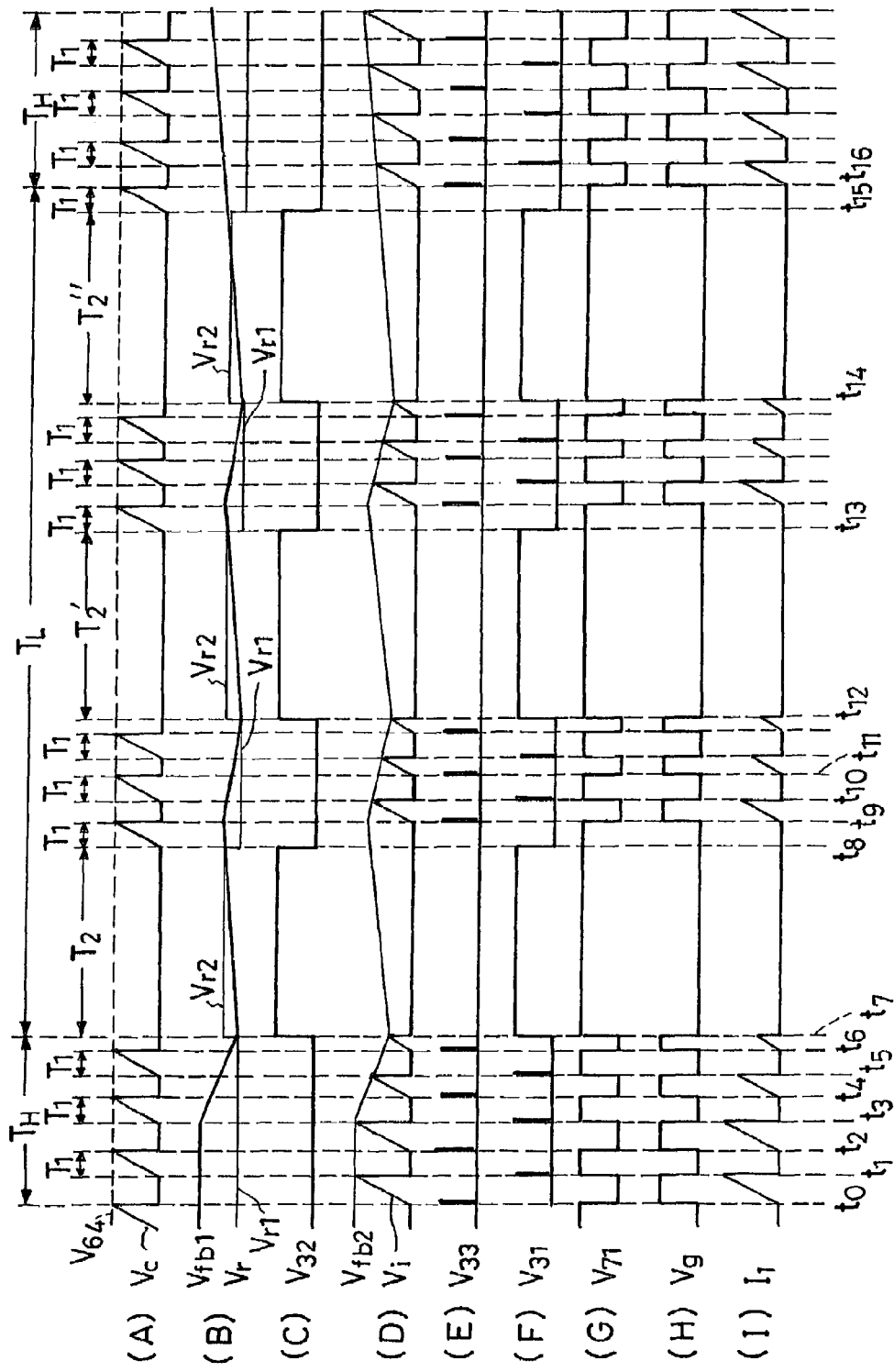
FIG. 4, consisting of (A) through (I), is a diagram of waveforms useful in explaining the operation of the switching power supply of FIGS. 1–3 in both normal load and light load mode.

The output voltage detector circuit 8 and dual voltage divider circuit 30 being constructed as above described with reference to FIG. 3, there are obtained both a first feedback signal $V_{fb1}$ at the junction $P_1$ between the resistors 43 and 44 of the dual voltage divider circuit and a second feedback signal $V_{fb2}$ at the junction $P_2$ between the resistors 44 and 56. These feedback signals $V_{fb1}$ and $V_{fb2}$ are both voltage signals, each having a voltage varying in inverse proportion to the dc output voltage $V_o$. At (B) and (D) in FIG. 4 are diagramed the waveforms of these feedback signals $V_{fb1}$ and $V_{fb2}$ during the operation of the switching power supply in normal load mode $T_H$ and light load mode $T_L$.

The two feedback signals $V_{fb1}$ and $V_{fb2}$ of different magnitudes are needed in this particular embodiment by the conduction terminator circuit 31 and mode selector circuit 32. However, these circuits 31 and 32 might be modified to require but one such feedback signal, in which case the dual voltage divider circuit 30 might also be modified to provide the required one signal for delivery to both modified conduction terminator circuit and modified mode selector circuit.

The conduction terminator circuit 31 of the FIG. 3 switch control circuit 7 is shown as comprising a comparator 48 and an OR gate 49, although the current detect resistor 10, FIG. 1, might be considered a part of the conduction terminator circuit 31. The comparator 48 has a positive input connected to the switch control circuit input 27 for inputting the voltage regulator switch current detect signal $V_i$, and a negative input connected to the junction $P_2$ between the resistors 44 and 45 of the dual voltage divider circuit 30 for inputting the second feedback signal $V_{fb2}$ over the conductor 47. Comparing the switch current detect signal $V_i$ and second feedback signal $V_{fb2}$ as at (D) in FIG. 4, the comparator 48 puts out a conduction terminator pulse $V_{31}$ as at (F) in FIG. 4 each time the switch current detect signal $V_i$ overshoots the second feedback signal $V_{fb2}$.

The OR gate 49 has one input connected to the comparator 48, and another input connected to the mode selector circuit 32 by way of a conductor 50. As indicated at (C) in FIG. 4, the output (mode select signal) $V_{32}$ from the mode selector circuit 32 is low, as from $t_0$ to $t_7$, to permit the voltage regulator switch 3 to be driven continuously in normal load mode $T_H$, and intermittently high, as from $t_7$ to $t_{16}$, to permit the switch 3 to be driven at intervals in light load mode $T_L$. The OR gate 49 passes not only the conduction terminator pulses $V_{31}$ when the mode select signal $V_{32}$ is low to dictate the normal load mode, but also the pulses of the mode select signal $V_{32}$ when this signal dictates the light load mode.

The mode selector circuit 32 includes a comparator 52 having a positive input connected to the junction $P_1$ between the resistors 43 and 44 of the dual voltage divider circuit 30 for inputting the first feedback signal $V_{fb1}$ by way of a conductor 46, and a negative input connected to a dual reference voltage circuit 51 for inputting a reference voltage $V_r$ which changes between two values. More specifically, as indicated at (B) in FIG. 4, the dual reference voltage circuit 51 selectively provides a first reference voltage $V_{r1}$ and second reference voltage $V_{r2}$, the first being less than the second.

The dual reference voltage circuit 51 includes a serial connection of voltage-dividing resistors 55 and 56 between a dc supply terminal 54 and the ground. A third voltage-dividing resistor 57 is connected in parallel with the second voltage-dividing resistor 56 via a reference voltage selector switch 58, and directly in series with the first voltage-dividing resistor 55. The dc supply terminal 54 provides a constant dc voltage $V_s$. (Alternatively, there may be supplied from this terminal 43 a dc voltage that has been modified to vary in inverse proportion to the dc input voltage $V_{in}$ as in FIG. 7, to which reference will be later had in association with the embodiment of FIGS. 5 and 6.) The junction 59 between the first and the second voltage-dividing resistors 55 and 56, as well as between the first and the third voltage-dividing resistors 55 and 57, is connected to the negative input of the comparator 52.

Employed for selective application of the two reference voltages $V_{r1}$ and $V_{r2}$ to the comparator 52 is the reference voltage selector switch 58 which has its control input connected to the output of that comparator 52. The reference voltage selector switch 58 performs the following two functions:

1. Switching from the first reference voltage $V_{r1}$ to the higher second reference voltage $V_{r2}$ in response to the output from the comparator 52 indicating that the first feedback signal $V_{fb1}$ has dropped to the first reference voltage $V_{r1}$ as at $t_7$, $t_{12}$ and $t_{14}$ at (B) in FIG. 4.

2. Switching from the second reference voltage $V_{r2}$ to the lower first reference voltage $V_{r1}$ in response to the comparator output indicating that the first feedback signal $V_{fb1}$ has risen to the second reference voltage $V_{r2}$ as at $t_8$ and $t_{13}$ at (B) in FIG. 4.

Constantly comparing the incoming first feedback signal $V_{fb1}$ against either of the reference voltages $V_{r1}$ and $V_{r2}$, the comparator 52 goes high when the first feedback signal grows higher than the incoming reference voltage, and low when the first feedback signal becomes less than the incoming reference voltage. The output of the mode select comparator 52 is connected to the output conductor 50 of the mode selector circuit 32 via an inverter 53. The output $V_{32}$ from the mode selector circuit 32 is therefore an inversion of the output from the mode select comparator 52, as depicted at (C) in FIG. 4.

The reference voltage selector switch 58 of the dual reference voltage circuit 51 is closed when the mode select comparator 52 goes high. As will be noted from the inversion of its output given at (C) in FIG. 4, the mode select comparator 52 is high during the normal load periods $T_H$, as before $t_7$ in FIG. 4, so that the first reference voltage $V_{r1}$ is applied from dual reference voltage circuit 51 to mode select comparator 52. In light load mode, on the other hand, the output voltage $V_o$ of the switching regulator will rise thereby causing a drop in the first feedback signal $V_{fb1}$ until this feedback signal crosses the first reference voltage $V_{r1}$ at $t_7$ at (B) in FIG. 4. Thereupon the mode select comparator 52 goes low thereby causing the reference voltage selector switch 58 to open, with the consequent application of the second reference voltage $V_{r2}$ to the mode select comparator 52. The second reference voltage $V_{r2}$ is made so much higher than the first reference voltage $V_{r1}$ that the mode select comparator 52 will remain stably low from $t_7$ to $t_8$ as at (C) in FIG. 4 in the face of some oscillations of the first reference signal $V_{fb1}$.

In light mode period $T_L$ lasting from $t_7$ to $t_{16}$ in FIG. 4, the voltage regulator switch 3 is not driven as from $t_7$ to $t_8$ and is driven as from $t_8$ to $t_{12}$. No energy transfer occurs from the primary to the secondary side of the transformer 2 during each such undriven interval of the voltage regulator switch, resulting in a gradual drop in the voltage $V_o$ across the smoothing capacitor 19, FIG. 1. As a consequent, as at (B) in FIG. 4, the first feedback signal $V_{fb1}$ will develop gradually, overshooting the second reference voltage $V_{r2}$ at $t_8$. Thereupon the mode select comparator 52 of the mode selector circuit 32 will go high, and the reference voltage selector switch 58 will be closed for reapplication of the first reference voltage $V_{r1}$ to the mode select comparator 52. Once going high at $t_8$, the mode select comparator 52 will stably remain so thereafter because then there is a sufficient difference between first reference voltage signal $V_{fb1}$ and first reference signal $V_{r1}$.

In light load mode, as will be detailed presently, the voltage regulator switch 3 is driven when the mode select comparator 52 is high (inverter 53 low), as from $t_8$ to $t_{12}$ and from $t_{13}$ to $t_{14}$. Upon recommencement of energy transfer to the secondary side of the transformer, as at $t_9$ immediately following $t_8$ when the driving of the voltage regulator switch 3 is restarted, the dc output voltage $V_o$ will start rising again whereas the first feedback signal $V_{fb1}$ will start dwindling as at (B) in FIG. 4 until $t_{12}$ when it undershoots the first reference voltage $V_{r1}$. Thus the mode select comparator 52 of the mode selector circuit 32 will go low at $t_{12}$, as it did at $t_7$. The voltage regulator switch 3 will not be driven from $t_{12}$ to $t_{13}$, as from $t_7$ to $t_8$. The above described operation from $t_7$ to $t_{12}$ represents one cycle of the light load mode. The same cycle will repeat itself until $t_{16}$ when the normal load mode is shown to resume.

The first feedback signal $V_{fb1}$ will be consistently higher than the first reference voltage $V_{r1}$ as at (B) in FIG. 4 in the resumed normal load mode operation after $t_{16}$. The output $V_{32}$ from the mode selector circuit 32 will therefore be consistently low as at (C) in FIG. 4. The voltage regulator switch 3 will be driven consistently as long as the normal load mode persists.

It will be appreciated that the provision of the two different reference voltages $V_{r1}$ and $V_{r2}$ imparts hysteresis to the mode select comparator 52 of the mode selector circuit 32. Comparing the first feedback signal $V_{fb1}$ against the two different reference voltages $V_{r1}$ and $V_{r2}$, the hysteretic mode select comparator 52 positively evaluates the load for selective driving of the voltage regulator switch 3 in either normal or light load mode.

As also shown in detail in FIG. 3, the conduction initiator circuit 33 includes a timing capacitor 60 connected to a dc supply terminal 61 via a constant current source or circuit 62 on one hand and, on the other, grounded. Connected in parallel with the timing capacitor 60, a discharge switch 63 opens to permit the capacitor to be charged with the current of constant magnitude from the constant current circuit 62. The voltage $V_c$ across the timing capacitor 60 rises with a gradient, as at (A) in FIG. 4, while the capacitor is being so charged. When closed, on the other hand, the discharge switch 63 causes the timing capacitor 60 to be discharged, and holds the capacitor voltage $V_c$ at zero as long as the switch is closed.

The junction $P_3$ between timing capacitor 60 and constant current circuit 62 is connected to the positive input of a timing comparator 65, the negative input of which is connected to a source 64 of reference voltage $V_{64}$. The timing comparator 65 puts out a conduction initiator pulse $V_{33}$ of brief duration, as at (E) in FIG. 4, each time the voltage $V_c$ across the timing capacitor 60 overshoots the reference voltage $V_{64}$. Fed over a conductor 68 to the set input S of an RS flip-flop 71 included in the switch control pulse generator circuit 34, the conduction initiator pulses $V_{33}$ determine the beginnings of the switch control pulses $V_g$, at (H) in FIG. 4, which are created in that circuit 34. The switch control pulses $V_g$ are applied to the voltage regulator switch 3, FIG. 1, to cause conduction therethrough.

Under the control of a NAND circuit 66 the discharge switch 63 is closed during the conducting periods of the voltage regulator switch 3, as from $t_0$ to $t_1$, $t_2$ to $t_3$, and so forth in FIG. 4, and opens when the voltage regulator switch does, as will be explained in more detail subsequently. The timing capacitor 60 starts to be charged with the constant current at the ends of the conducting periods, and the beginnings of the nonconducting periods, of the voltage regulator switch 3, as at $t_1$ and $t_3$ in FIG. 4. The timing capacitor voltage $V_c$ starts rising with a gradient at these moments $t_1$, $t_3$ etc. and drops to zero upon lapse of a preassigned length of time $T_1$. This period $T_1$ from the beginning to the end of each charging session of the timing capacitor 60 is constant throughout all the periods $t_0$–$t_7$, $t_8$–$t_{12}$, $t_{13}$–$t_{14}$ and $t_{15}$– during which the voltage regulator switch 3 is driven.

For on-off control of the discharge switch 63 the NAND circuit 66 has one of its two inputs connected to an inverter 67 and thence to the inverter 53 of the mode selector circuit 32 by way of a conductor 69, for inputting the mode select signal $V_{32}$. The other input of the NAND circuit 66 is connected to the inverting output, designated Q with a bar atop, of the flip-flop 71 of the switch control pulse generator circuit 34 by way of a conductor 70 for inputting the signal $V_{71}$, at (G) in FIG. 4, indicative of the conducting and nonconducting periods of the voltage regulator switch 3. As a result, the NAND circuit 66 is high both during the conducting periods of the voltage regulator switch 3 and when the mode select signal $V_{32}$ is high. The discharge switch 63 is closed during all these periods to hold the timing capacitor voltage $V_c$ at zero as at (A) in FIG. 4.

The switch control pulse generator circuit 34 includes an inverting switch driver circuit 72 in addition to the noted RS flip-flop 71. This flip-flop has its set input S connected as aforesaid to the timing comparator 65 of the conduction initiator circuit 33, and its reset input R to the OR gate 49 of the conduction terminator circuit 31. The flip-flop 71 is therefore set by the conduction initiator pulses $V_{33}$, at (E) in FIG. 4, and reset by the conduction terminator pulses $V_{31}$, at (F) in FIG. 4. The resulting inverted output $V_{71}$ from the flip-flop 71 is low when it is set, and high when it is reset.

Connected between the inverting output of the flip-flop 71 and the switch control pulse output 26 of the switch control circuit 7, the inverting switch driver circuit 72 creates the switch control pulses $V_g$ by phase-inverting the output $V_{71}$ from the flip-flop 71. The switch control pulses $V_g$ are applied to the control input of the voltage regulator switch 3 for driving the same in either normal load mode $T_H$, as before $t_7$ and after $t_{16}$ in FIG. 4, or light load mode, as from $t_7$ to $t_{16}$ in FIG. 4. The voltage regulator switch 3 is driven intermittently in light load mode, not driven as from $t_7$ to $t_8$, from $t_{12}$ to $t_{13}$, and from $t_{14}$ to $t_{15}$, during which the output $V_{32}$ from the mode selector circuit 32 indicates that the first feedback signal $V_{fb1}$ is less than the second reference voltage $V_{r2}$.

FIG. 3 further indicates in block form the undervoltage protection circuit 35 connected to the dc supply terminal 25 of the switch control circuit 7. This circuit 35 prevents the various constituent circuits of the switch control circuit 7 from being fed from the supply terminal 25 when the incoming supply voltage is less than a predefined limit. The constituent circuits of the switch control circuit 7 are thus protected from malfunctioning in low-voltage conditions.

The advantages gained by the representative form of switching power supply according to the invention, set forth hereinabove with reference to FIGS. 1–4, may be recapitulated as follows:

1. The switching frequency is not fixed but variable; that is, although the nonconducting periods $T_1$ of the voltage regulator switch 3 are fixed, its conducting periods are subject to change as a result of comparison of the switch current detect signal $V_i$ and the second feedback signal $V_{fb2}$ as at (D) in FIG. 4. As the switching frequency is thus varied over some spectrum, less power loss occurs per unit length of time due to each frequency component of the noise. Noise, if any, caused by the on-off operation of the voltage regulator switch 3 is therefore to exert less effects, both internally and externally of the switching power supply, than if the switching frequency were fixed, as has been the case heretofore.

2. The nonconducting periods $T_1$ of the voltage regulator switch 3 remain the same when it is driven at intervals in light load mode $T_L$, as from $t_8$ to $t_{12}$ and from $t_{13}$ to $t_{14}$ in FIG. 4, as in normal load mode $T_H$. The voltage regulator switch 3 is therefore driven as stably in light load mode as in normal load mode.

3. The voltage regulator switch 3 is left unactuated at intervals in light load mode $T_L$, as from $t_7$ to $t_8$, from $t_{12}$ to $t_{13}$, and from $t_{14}$ to $t_{15}$ in FIG. 4. The mean switchings per unit length of time of each light mode period $T_L$ are therefore drastically less than if the switch were driven continuously. The invention offers in this respect the same advantage of higher efficiency as do the unexamined Japanese patent applications cited herein.

4. The dual voltage divider circuit 30, shown in detail in FIG. 3, is simplified in construction as the photoreceptor 9 is connected to the same circuit point $P_1$ as the junction between the voltage-dividing resistors 43 and 44 for providing the first feedback signal $V_{fb1}$. (It is understood that the reference voltage $V_r$ of the mode selector circuit 32 is so determined as to assure proper functioning of the photoreceptor 9.)

5. The mode selector circuit 32 operates hysteretically thanks to the dual reference voltage circuit 51, for accurate determination of which of the normal and light load modes is to be adopted for driving the voltage regulator switch 3.

6. The conduction initiator circuit 33 is reliable in its creation of the conduction initiator pulses, being responsive to both mode selector circuit 32 and switch control pulse generator circuit 34.

7. The switch control circuit 6 is guarded against malfunctioning in low-voltage conditions by the undervoltage protection circuit 35.

Figure 5:
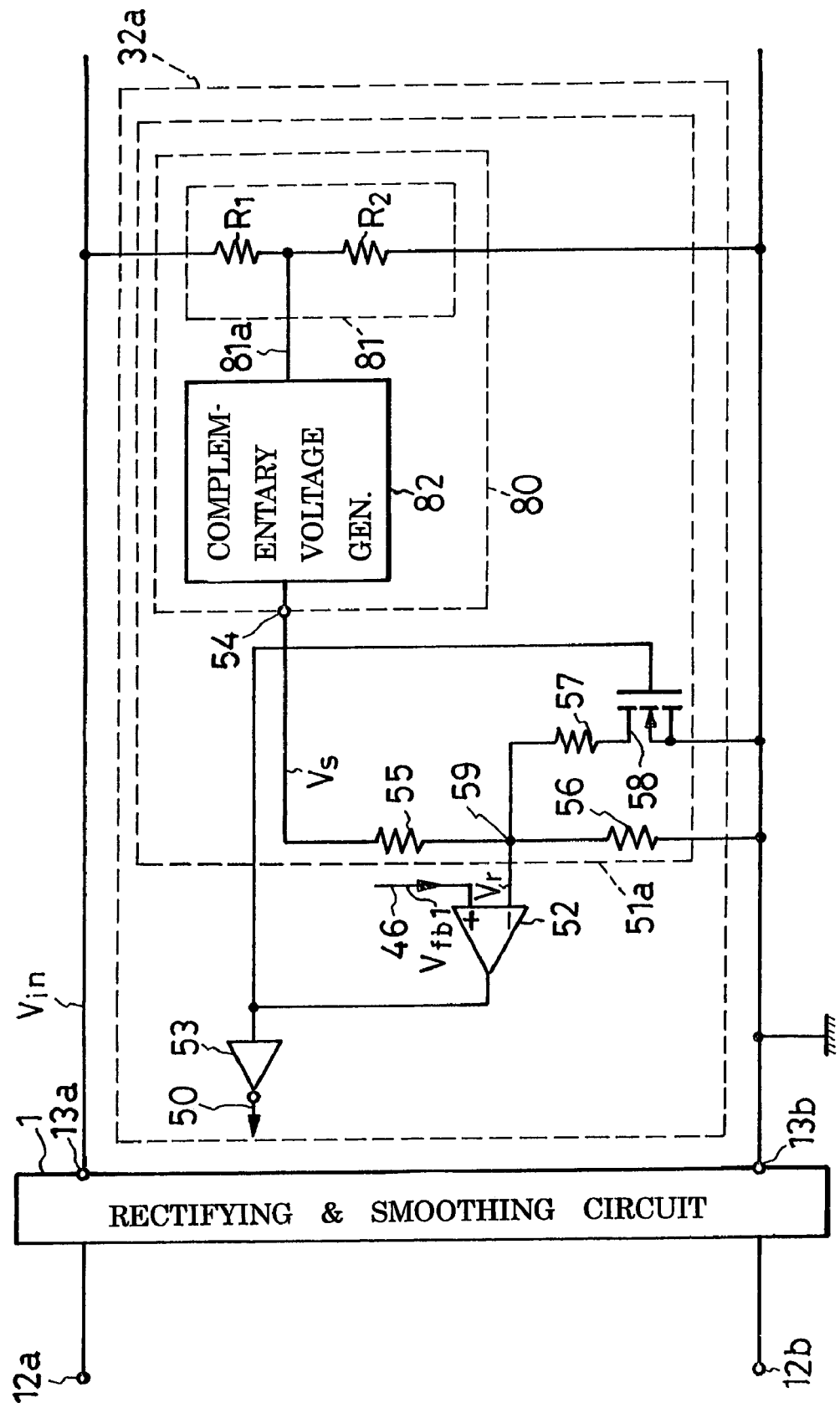
FIG. 5 is a schematic electrical diagram of a modification of the mode selector circuit in the switching power supply of FIGS. 1–3.
Figure 6:
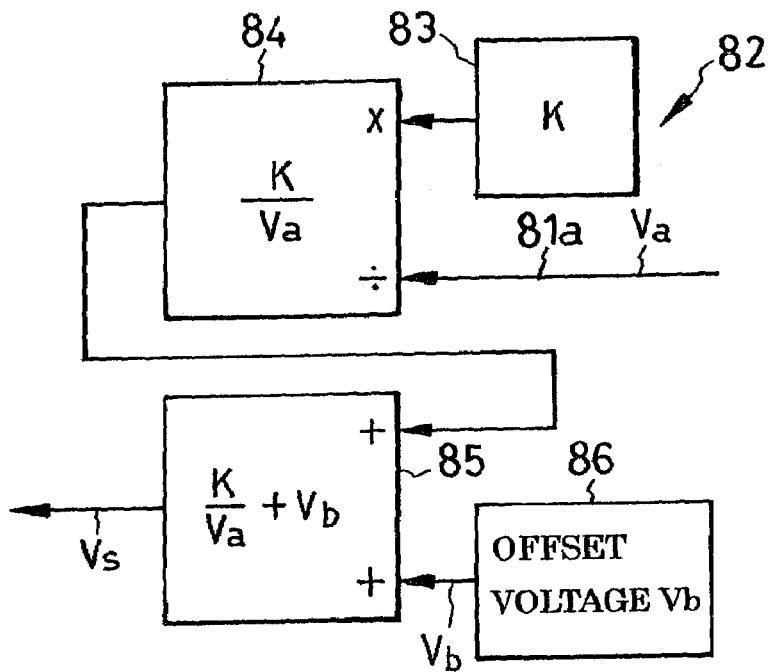
FIG. 6 is a block diagram showing in more detail the complementary voltage generator circuit in the modified mode selector circuit of FIG. 5.
Figure 7:
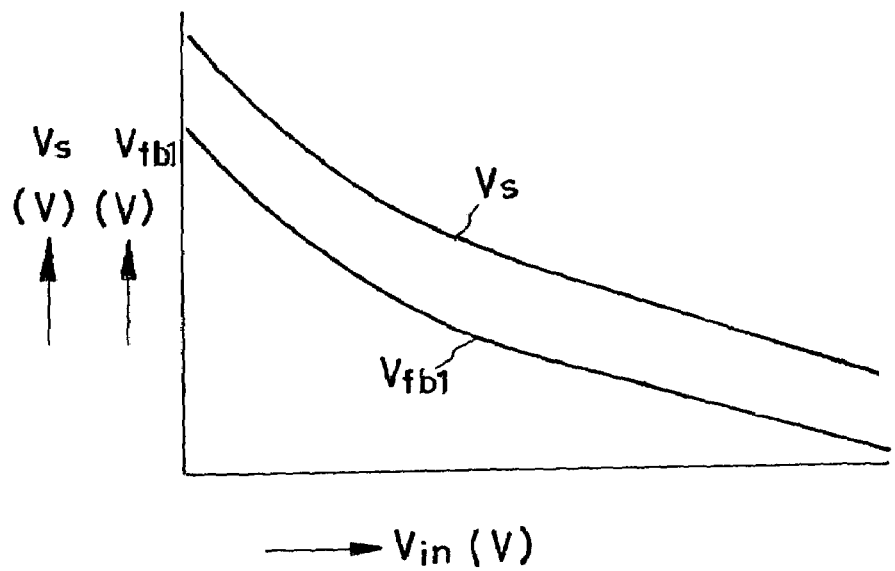
FIG. 7 is a graph plotting the curves of the feedback signal and reference supply voltage against the dc input voltage in the modified mode selector circuit of FIG. 5.

Embodiment of FIGS. 5–7

The mode selector circuit 32 of the FIGS. 1–4 embodiment is modifiable as indicated at $32_a$ in FIG. 5. The modified mode selector circuit $32_a$ features a complementary power supply circuit 80 incorporating a complementary voltage generator circuit 82 in order to preclude malfunctioning due to fluctuations in the supply voltage of the mode selector circuit. As will be understood from a comparison of FIGS. 3 and 5, the original mode selector circuit 32 and modified mode selector circuit $32_a$ are akin in construction except that in the latter circuit $32_a$, the complementary power supply circuit 80 is connected to the supply terminal 54. Applied to the supply terminal 54 in the modified mode selector circuit $32_a$ is not just a constant dc voltage but a voltage $V_s$ that varies in inverse proportion to the dc input voltage $V_{in}$ between the pair of dc output terminals $13_a$ and $13_b$ of the first rectifying and smoothing circuit 1.

The first feedback signal $V_{fb1}$, applied to the positive input of the mode select comparator 52 of the modified mode selector circuit $32_a$, is inversely proportional to the dc output voltage $V_o$, as has been stated in conjunction with FIG. 3. The dc output voltage $V_o$ in turn is proportional to the dc input voltage $V_{in}$. As a result, even if the power requirement of the load 22 is constant, the first feedback signal $V_{fb1}$ changes with the dc input voltage $V_{in}$ as in FIG. 7, and so does the second feedback signal $V_{fb2}$. In the presence of fluctuations in the dc input voltage $V_{in}$, therefore, proper mode selection may not be made if a constant voltage is supplied from the supply terminal 54 to provide constant reference voltages $V_{r1}$ and $V_{r2}$ at the junction 59 among the resistors 55–57. This problem is overcome in this alternate embodiment by providing at the supply terminal 54 the voltage $V_s$ which changes in inverse proportion to the dc input voltage $V_{in}$.

Referring more specifically to FIG. 5, the complementary power supply circuit 80 comprises an input voltage detector circuit 81 and the complementary voltage generator circuit 82. The input voltage detector circuit 81 includes two voltage-dividing resistors $R_1$ and $R_2$ interconnected in series between the pair of dc output terminals $13_a$ and $13_b$ of the first rectifying and smoothing circuit 1. A desired fraction of the dc input voltage $V_{in}$ is obtained on a output conductor $81_a$ connected to the junction between the voltage-dividing resistors $R_1$ and $R_2$. Despite the showing of FIG. 5 the dc input voltage $V_{in}$ could be detected indirectly, that is, via a voltage proportional to the input voltage, rather than directly as in this embodiment of the invention. For example, the voltage developing across the transformer tertiary 17 during the conducting periods of the voltage regulator switch 3 may be detected via a diode, and the resulting voltage signal smoothed, to provide a signal indicative of the dc input voltage $V_{in}$.

The complementary voltage generator circuit 82 of the complementary power supply circuit 80 is shown in more detail in FIG. 6. At 83 in this figure is shown a coefficient generator circuit for providing a prescribed coefficient K. Capable of both multiplication and division, a first arithmetic circuit 84 has an input connected to the coefficient generator circuit 83, and another input connected to the input voltage detector circuit 81, FIG. 5, by way of the conductor $81_a$. The first arithmetic circuit 84 obtains a value $1/V_a$ inversely proportional to the fraction $V_a$ of the dc input voltage $V_{in}$ and multiplies the value $1/V_a$ by the coefficient K. This coefficient K is determined internally of the circuit.

Also included in the complementary voltage generator circuit 82 is a second arithmetic circuit 85 having a first input connected to the first arithmetic circuit 84 and a second input connected to an offset voltage generator circuit 86. This second arithmetic circuit 85 is an adder, providing a complementary supply voltage $V_s$ resulting from the addition of the output $K/V_a$ from the first arithmetic circuit 84 and the offset voltage $V_b$ from the offset voltage generator circuit 86.

With reference back to FIG. 6 the complementary power supply circuit 80 thus provides the complementary supply voltage $V_s$ which is inversely proportional to the input voltage $V_{in}$, for application to the serial connection of the resistors 55 and 56. The modified reference voltage circuit $51_a$ provides the reference voltages $V_{r1}$ and $V_{r2}$ which are inversely proportional to the input voltage $V_{in}$.

It will be appreciated in connection with the FIGS. 5 and 6 embodiment that both first feedback signal $V_{fb1}$ and reference voltages $V_{r1}$ and $V_{r2}$ are variable with the dc input voltage $V_{in}$. The power requirement of the load is therefore accurately ascertainable in the face of possible fluctuations in the dc input voltage $V_{in}$.

Figure 8:
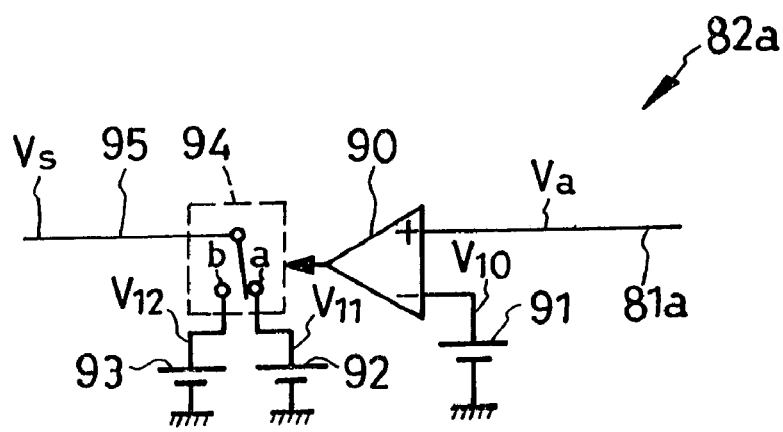
FIG. 8 is a schematic electrical diagram of an adaptive voltage supply circuit to be connected to the dc supply terminal of the mode selector circuit of the switching power supply of FIGS. 1–3.
Figure 9:
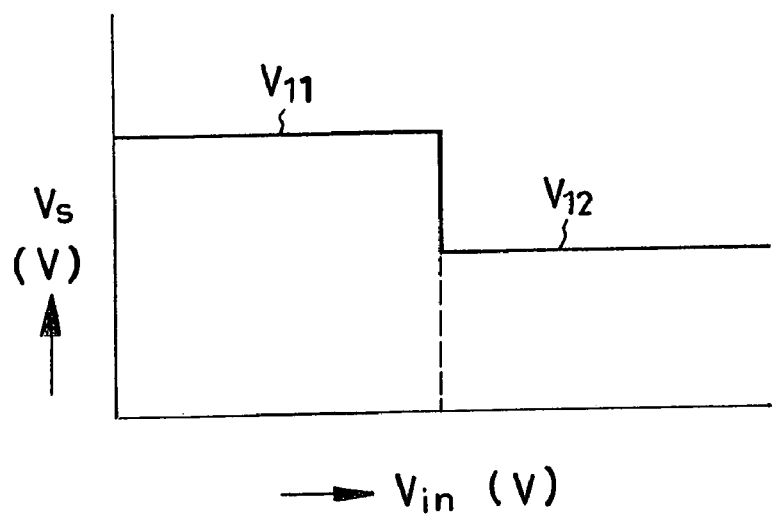
FIG. 9 is a graphic representation of the relationship between the output voltage of the adaptive voltage supply circuit of FIG. 8 and the dc input voltage of the switching power supply.

Embodiment of FIGS. 8 and 9

The commercial ac power supply is of 100 volts in some countries or regions and 200 volts in others. This embodiment represents an adaptation of the first disclosed switching power supply for use in both of such countries or regions.

In FIG. 8 is shown an adaptive voltage supply circuit $82_a$ to be connected to the dc supply terminal 54, FIG. 3 or 5, of the mode selector circuit 32 or $32_a$ for providing a different supply voltage $V_s$ depending upon the commercial ac power supply to which this switching power supply is connected is of 100 or 200 volts. The adaptive voltage supply circuit $82_a$ includes a comparator 90 having one input connected to the output conductor $81_a$ of the input voltage detector circuit 81, FIG. 5, and another input connected to a source 91 of reference voltage $V_{10}$. This reference voltage $V_{10}$ may be preset at a value intermediate the expected minimum and maximum of the output voltage $V_a$ of the input voltage detector circuit 81, that is, intermediate a predefined fraction of 100 volts and that of 200 volts. Preferably, the reference voltage $V_{10}$ may be set equal to the output voltage $V_a$ of the input voltage detector circuit 81 when the ac input voltage $V_{ac}$ between the pair of ac input terminals $12_a$ and $12_b$, FIG. 1, has some arbitrary value between 140–170 volts. The output from the comparator 90 is low when the output voltage $V_a$ of the input voltage detector circuit 81 is less than the reference voltage $V_{10}$, and high when the voltage $V_a$ is higher than the reference voltage $V_{10}$.

The output from the comparator 90 is applied to a selector switch 94 which is equivalently shown as having a movable contact movable into and out of engagement with either of two fixed contacts a and b. These fixed contacts a and b are connected respectively to two sources 92 and 93 of predetermined different voltages $V_{11}$ and $V_{12}$. The movable contact engages the first fixed contact a, connecting the first voltage source 92 to the output conductor 95, when the output from the comparator 90 is low, and engages the second fixed contact b, connecting the second voltage source 93 to the output conductor 95, when the output from the comparator 90 is high. Either of the voltages $V_{11}$ and $V_{12}$ thus chosen is applied as the supply voltage $V_s$ to the resistor 55, FIG. 3 or 5.

The selector switch 94 is shown in FIG. 8 as a mechanical switch for simplicity. In practice two electronic switches may be employed for selectively connecting the two reference voltage sources 92 and 93 to the output.

Such being the construction of the adaptive voltage supply circuit $82_a$, the comparator 90 goes low when the commercial ac power supply is of 100 volts. The first voltage $V_{11}$ is then chosen by the selector switch 94 and fed over the conductor 95 to the voltage-dividing resistors 55–57, FIG. 5, as the supply voltage $V_s$. When the commercial ac power supply is of 200 volts, on the other hand, the comparator 90 goes high thereby causing the selector switch 94 to select the second voltage $V_{12}$ for delivery over the conductor 95 as the supply voltage $V_s$.

FIG. 9 graphically demonstrates the desired relationship between supply voltage $V_s$ and input voltage $V_{in}$. The supply voltage $V_s$ should be lower when the ac power supply is of 200 volts than when it is of 100 volts. The higher voltage $V_{11}$ is therefore employed when the ac input voltage is 100 volts, and the lower voltage $V_{12}$ when the ac input voltage is 200 volts. The selective use of the two different supply voltages $V_{11}$ and $V_{12}$ depending upon the ac input voltage is conductive to more accurate determination of the power requirement of the load 22.

Generally, the higher the input voltage $V_{in}$, the lower should be the supply voltage $V_s$. The adaptive voltage supply circuit $82_a$ of FIG. 8 is therefore subject to further refinement, such that there may be employed a parallel connection of two or more comparators each for comparing the output voltage $V_a$ of the input voltage detector circuit 81, FIG. 5, with one of a series of different reference voltages. The input voltage $V_{in}$ may thus be determined in multiple stages. As any one of the parallel comparators goes high or low as a result of a change in the input voltage $V_{in}$, one of the two different voltages may be fed to the voltage-divider circuit of FIG. 5. There can thus be obtained the supply voltage $V_s$ that decrements with a rise in the input voltage $V_{in}$, much like the continuously varying voltage $V_s$ in the graph of FIG. 7.

Figure 10:
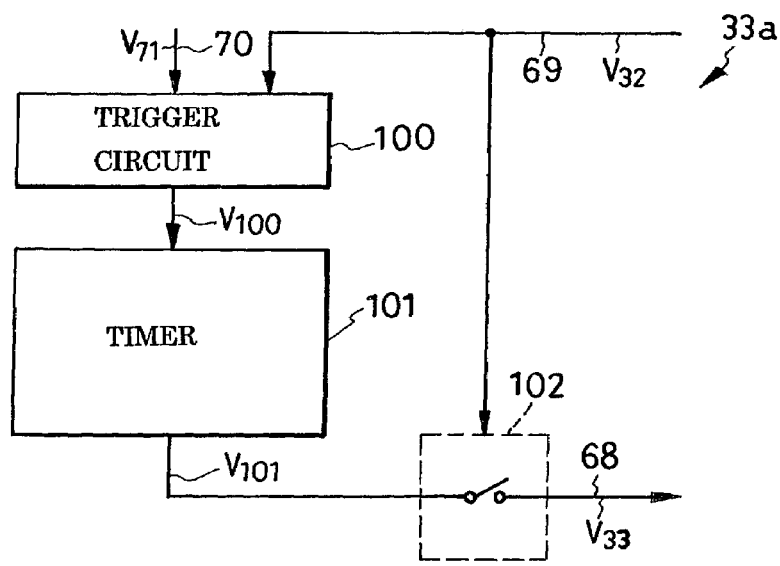
FIG. 10 is a block diagram of a modification of the conduction initiator circuit in the switching power supply of FIGS. 1–3.
Figure 11:
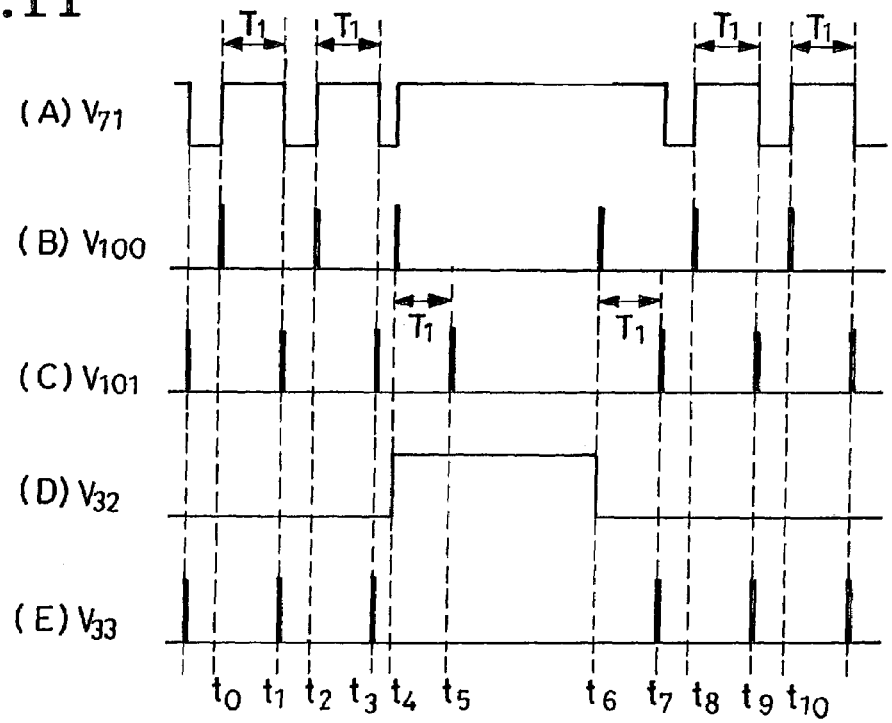
FIG. 11, consisting of (A) through (E), is a diagram of waveforms useful in explaining the operation of the modified conduction initiator circuit of FIG. 10.

Embodiment of FIGS. 10 and 11

FIG. 10 shows a modified conduction initiator circuit $33_a$ for use in the switching power supply of FIGS. 1–3 in substitution for the first disclosed conduction initiator circuit 33. The modified conduction initiator circuit $33_a$ includes a trigger circuit 100 having an input connected to the RS flip-flop 71, FIG. 3, of the switch control pulse generator circuit 34 by way of the conductor 70 for inputting the inverted output $V_{71}$ therefrom. The trigger circuit 100 has another input connected to the mode selector circuit 32, shown in detail in FIG. 3, by way of the conductor 69 for inputting the mode select signal $V_{32}$.

At (A) in FIG. 11 is shown the inverted output $V_{71}$, from the flip-flop 71 which indicates the periods $T_1$ during which the voltage regulator switch 3 is open. The trigger circuit 100 responds to the rises of these flip-flop output pulses, as at $t_0$, $t_2$ and $t_4$, to generate trigger pulses $V_{100}$ given at (B) in FIG. 11. Additionally, the trigger circuit 100 responds to both rises and decays of the mode select signal $V_{32}$, (D) in FIG. 11, fed over the output conductor 69 of the mode selector circuit 32. The additional trigger pulses $V_{100}$ thus generated are indicated at $t_4$ and $t_6$. The rising moment $t_4$ of the mode select signal $V_{32}$ at (D) in FIG. 11 agrees with that of one longer duration pulse shown included in the inverted flip-flop output $V_{71}$, at (A) in FIG. 11.

As will be seen by referring back to FIG. 4, the conduction terminator pulses $V_{31}$ from the conduction terminator circuit 31 rises in synchronism with the inverted output pulses $V_{71}$ of the flip-flop 71. These conduction terminator pulses $V_{31}$ may therefore be input to the trigger circuit 100 instead of the inverted output $V_{71}$ from the flip-flop 71.

Connected to the output of the trigger circuit 100, a timer 101 responds to each trigger pulse $V_{100}$ from the trigger circuit by putting out a pulse $V_{101}$, (C) in FIG. 11, upon lapse of a preassigned length of time $T_1$. An inhibit switch 102 is inserted between the timer 101 and the flip-flop 71, FIG. 3, of the switch control pulse generator circuit 34. Having a control input connected to the output conductor 69 of the mode selector circuit 32, the inhibit switch 102 is open from $t_4$ to $t_6$ in FIG. 11 when the mode select signal $V_{32}$ is high, blocking the pulse that is shown generated by the timer 101 at $t_5$ at (C) in FIG. 11. At $t_6$, when the mode select signal $V_{32}$ goes low, the trigger circuit 100 will generate another trigger pulse, as at (B) in FIG. 11, thereby causing the timer 101 to put out a corresponding pulse at $t_7$ upon lapse of the preassigned period $T_1$ after $t_6$, as at (C) in FIG. 11. This pulse at $t_7$ will be allowed through the inhibit switch 102 and fed over the conductor 68 to the switch control pulse generator circuit 34 as a conduction initiator pulse $V_{33}$. Thus, operating essentially like its FIG. 3 counterpart 33, the modified conduction initiator circuit $33_a$ offers the same advantages therewith.

Figure 12:
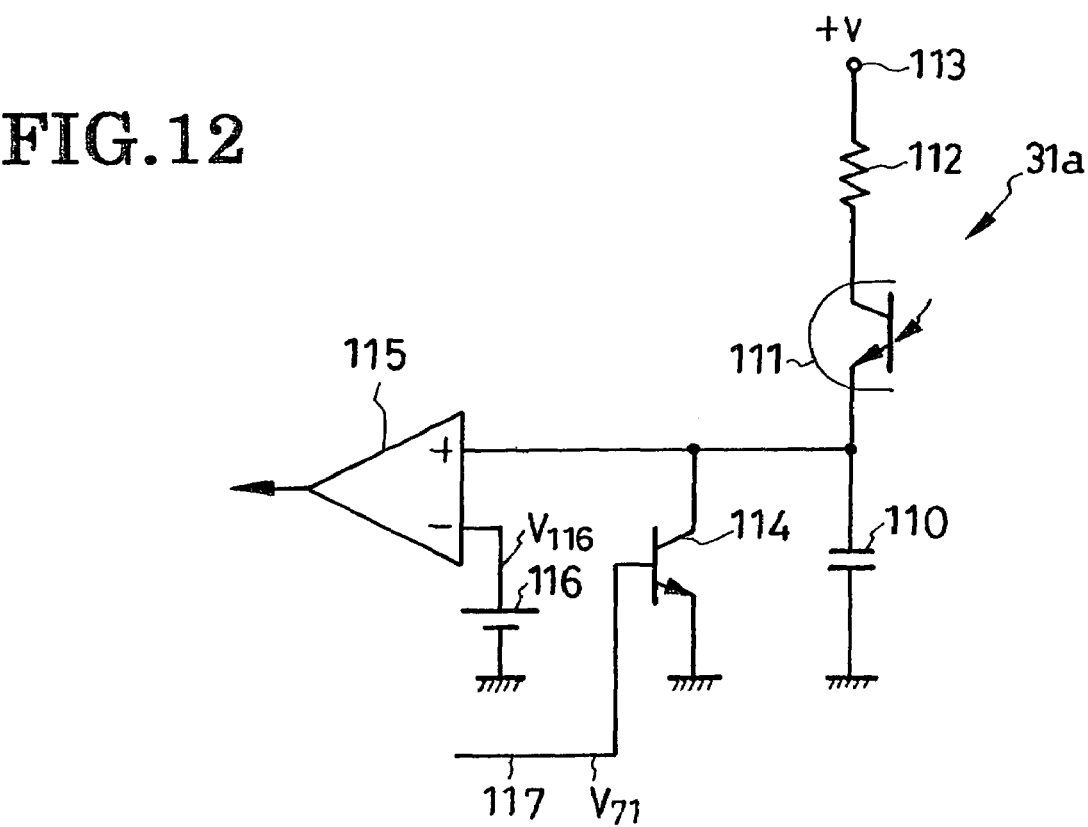
FIG. 12 is a schematic electrical diagram of a modification of the conduction terminator circuit in the switching power supply of FIGS. 1–3.
Figure 13:
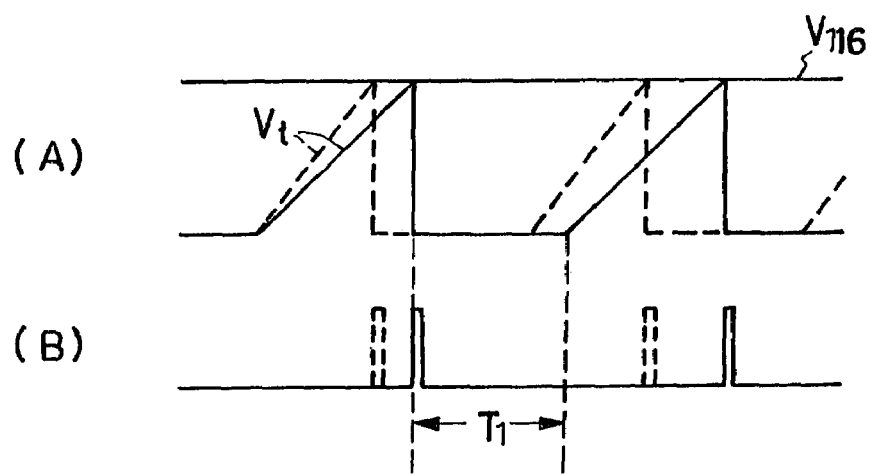
FIG. 13, consisting of (A) and (B), is a diagram of waveforms useful in explaining the operation of the modified conduction terminator circuit of FIG. 12.

Embodiment of FIGS. 12 and 13

FIG. 12 is an illustration of a modified conduction terminator circuit $31_a$ for use in the switching power supply of FIGS. 1–3 in substitution for the current detect resistor 10, FIG. 1, and original conduction terminator circuit 31, FIG. 3. The modified conduction terminator circuit $31_a$ includes a serial circuit of a sawtooth-generating capacitor 110, photoreceptor 111 and current-limiting resistor 112, which circuit is connected between dc supply terminal 113 and ground. The photoreceptor 111 is optically coupled to the light-emitting device 40, FIG. 3, of the output voltage detector circuit 8. The sawtooth-generating capacitor 110 is therefore charged from the supply terminal 113 via the current-limiting resistor 112 at a rate determined by the photoreceptor 111 in response to the dc output voltage $V_o$ between the pair of dc output terminals 20 and 21, FIG. 1. The resulting output of sawtooth waveform from the capacitor 110 is shown at (A) in FIG. 13.

A rise, say, in the dc output voltage $V_o$ of this switching power supply results in an output of greater light intensity from the light-emitting device 40, hence in less resistance offered by the photoreceptor 11, and hence in the charging of the capacitor 110 at a higher rate. As a consequence, the output waveform $V_t$ of the capacitor 110 changes from that indicated by the solid line to that of the dashed line.

For periodically discharging the sawtooth-generating capacitor 110 a switch 114 is connected in parallel therewith. This discharge switch 114 has a control terminal connected by way of a conductor 117 to the inverting output of the flip-flop 71, FIG. 3, of the switch control pulse generator circuit 84. The flip-flop output pulses $V_{71}$, shown at (G) in FIG. 4, thus applied to the discharge switch 117 are an inversion of the switch control pulses $V_g$ given at (H) in FIG. 4 and so are indicative of the nonconducting periods $T_1$ of the voltage regulator switch 3. The discharge switch 114 is therefore closed during the nonconducting periods $T_1$ of the voltage regulator switch 3, holding the voltage across the sawtooth-generating capacitor 110 at zero during these periods. The sawtooth-generating capacitor 110 is recharged from the supply terminal 113 upon termination of each nonconducting period $T_1$, when the discharge switch 114 is opened. The voltage across the capacitor 110 rises with a gradient during the ensuing conducting period of the voltage regulator switch 3.

A comparator 115 has a positive input connected to the capacitor 110, a negative input connected to a source 16 of a reference voltage $V_{116}$, and an output connected to the reset input R of the RS flip-flop 71, FIG. 3, of the switch control pulse generator circuit 34 via the OR gate 49. Each time the sawtoothed output $V_t$ from the capacitor 110 overshoots the reference voltage $V_{116}$ as at (A) in FIG. 13, the comparator 115 puts out a pulse, as at (B) in the same figure, for delivery to the flip-flop 71.

Since the capacitor 110 is charged at a rate proportional to the dc output voltage $V_o$, the voltage $V_t$ across the capacitor 110 develops from zero to the reference voltage $V_{116}$ in a correspondingly variable period of time, causing changes in the conducting periods of the voltage regulator switch 3. This embodiment differs from the first disclosed embodiment only in how the conduction of the voltage regulator switch 3 is terminated.

Figure 14:
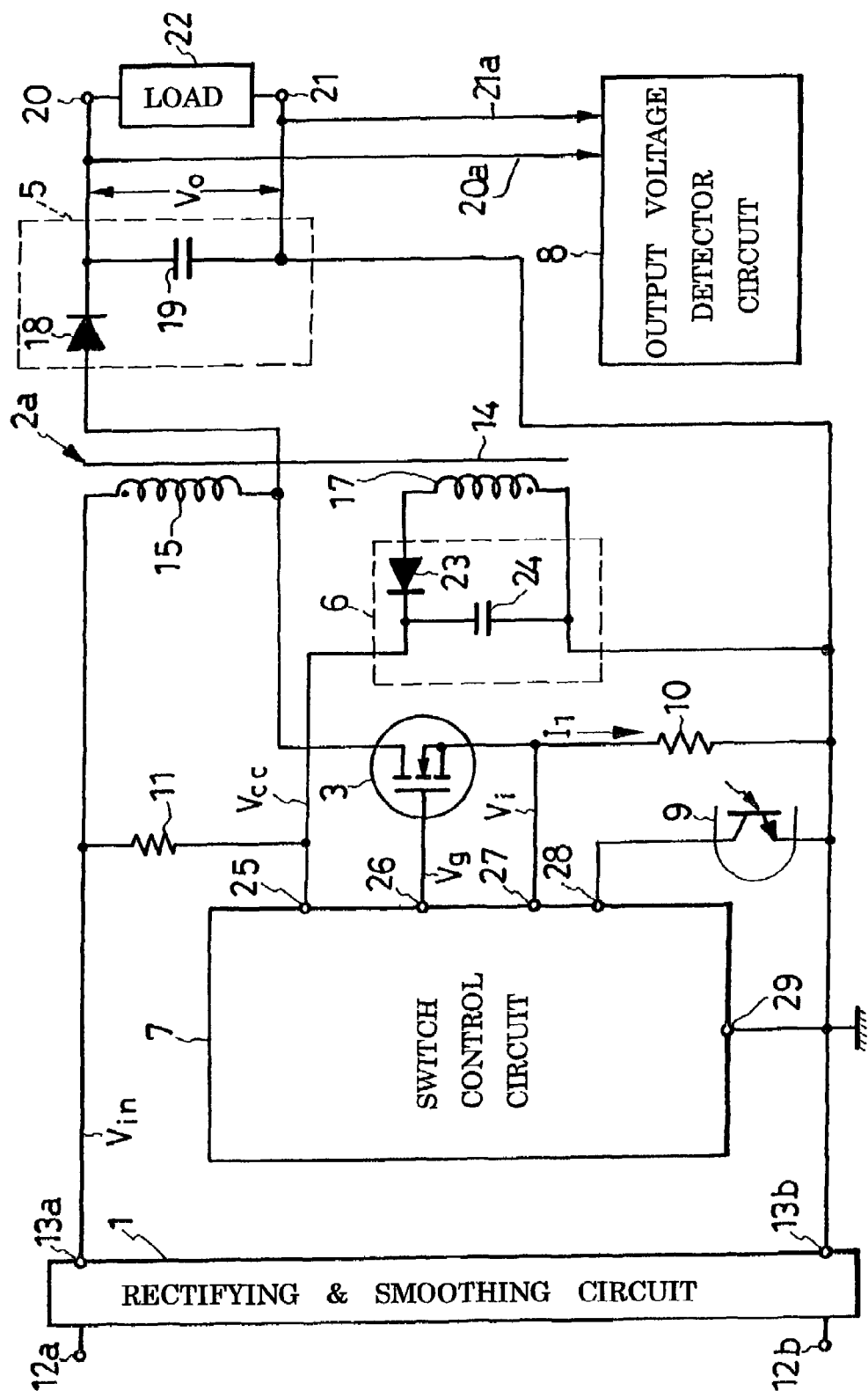
FIG. 14 is a diagram similar to FIG. 1 but showing an alternative form of switching power supply according to the invention.

Embodiment of FIG. 14

The switching power supply of FIG. 14 is similar in construction to that of FIG. 1 except that a reactor $2_a$ is employed in place of the transformer 2 of the FIG. 1 embodiment, the reactor having no equivalent to the secondary winding 16 of the transformer. Another difference is that the output rectifying and smoothing circuit 5 is connected in parallel with the voltage regulator switch 3 and current detect resistor 10. All the other details of construction are as previously set forth with reference to FIGS. 1 to 3.

During the conducting periods of the voltage regulator switch 3, when the rectifying diode 18 of the output rectifying and smoothing circuit 5 is reverse biased, energy is stored on the reactor winding 15. The thus-stored energy is released to feed the load 22 during the nonconducting periods of the voltage regulator switch 3 when the rectifying diode 18 is forward biased. The capacitor 19 of the output rectifying and smoothing circuit 5 is charged with the resultant of the input dc voltage $V_{in}$ and the voltage across the reactor winding 15. In short what is shown here is a step-up switching regulator. Incorporating the switch control circuit 7 of the same construction as that shown in FIGS. 1–3, it possesses all the advantages set forth in conjunction with the first disclosed embodiment of the invention.

POSSIBLE MODIFICATIONS

Notwithstanding the foregoing detailed disclosure it is not desired that the present invention be limited by the exact showing of the drawings or the description thereof. The following is a brief list of possible modifications, alterations or adaptations of the illustrated embodiments which are all believed to fall within the purview of the invention:

1. The invention is adaptable for a forward switching power supply wherein the transformer secondary and tertiary are of the same polarity as the primary, causing both diodes 18 and 23, FIG. 1, of the rectifying and smoothing circuits 5 and 6 to conduct when the voltage regulator switch 3 is closed.

2. The output voltage detector circuit could be included, either in part or in whole, in the switch control circuit 7.

3. The current detect resistor 10, FIG. 1, is replaceable by a Hall generator or the like.

4. The switch current detect signal $V_i$ and feedback signals $V_{fb1}$ and $V_{fb2}$ could all be reversed in polarity.

5. The dual reference voltage circuit 51, FIG. 3, is modifiable to comprise two self-contained sources of reference voltages $V_{r1}$ and $V_{r2}$, together with a selector switch for selective delivery of the two reference voltages to the mode select comparator 52 as at (B) in FIG. 4.

What is claimed is:

1. A switching dc power supply capable of operation in either normal load mode or light load mode depending upon the power requirement of a load, the dc power supply comprising:
    (a) dc input means for providing a dc input voltage;
    (b) inductance means connected to the dc input means;
    (c) a voltage regulator switch connected to the dc input means via the inductance means and adapted to be turned on and off for controlled application of the dc input voltage to the inductance means;
    (d) dc output means to be connected to a load;
    (e) a rectifying and smoothing circuit connected between the inductance means and the dc output means for providing a dc output voltage to be applied to the load;
    (f) feedback circuit means for providing a feedback signal indicative of the dc output voltage of the rectifying and smoothing circuit;
    (g) a switch control pulse generator circuit connected to the voltage regulator switch for applying switch control pulses thereto in order to controllably drive the voltage regulator switch;
    (h) a mode selector circuit connected to the feedback circuit means for generating a mode select signal, the mode select signal having a first state for permitting the switch control pulse generator circuit to drive the voltage regulator switch, and a second state for preventing the switch control pulse generator circuit from driving the voltage regulator switch;
    (i) a conduction terminator circuit connected between the feedback circuit means and the switch control pulse generator circuit for applying conduction terminator pulses to the latter in order to cause the switch control pulse generator circuit to terminate conduction through the voltage regulator switch as dictated by the feedback signal; and
    (j) a conduction initiator circuit connected to the switch control pulse generator circuit for applying conduction initiator pulses thereto in order to cause the switch control pulse generator circuit to initiate conduction through the voltage regulator switch upon lapse of a preassigned length of time following the termination of each conducting period of the voltage regulator switch, the conduction initiator circuit being connected to the mode selector circuit in order to be thereby prevented from applying the conduction initiator pulses to the switch control pulse generator circuit when the mode select signal is in the second state, and to resume application of the conduction initiator pulses to the switch control pulse generator circuit upon lapse of the preassigned length of time following the end of the second state of the mode select signal.

2. A switching dc power supply as defined in claim 1, wherein the conduction terminator circuit comprises:
    (a) switch current detector means for providing a switch current signal indicative of a current flowing through the voltage regulator switch; and
    (b) a comparator having a first input connected to the switch current detector means, and a second input connected to the feedback circuit means, for generating the conduction terminator pulses when the switch current signal crosses the feedback signal.

3. A switching dc power supply as defined in claim 1, wherein the conduction terminator circuit comprises:
    (a) a sawtooth-generating capacitor;
    (b) a charging circuit connected to the sawtooth-generating capacitor and associated with the feedback circuit means for charging the sawtooth-generating capacitor at a rate determined by the feedback signal;

(c) a discharge switch connected in parallel with the sawtooth-generating capacitor for discharging the same during the nonconducting periods of the voltage regulator switch; and (d) a comparator having a first input connected to the sawtooth-generating capacitor, and a second input connected to a source of a reference voltage, for putting out the conduction terminator pulses when a voltage across the sawtooth-generating capacitor crosses the reference voltage.

4. A switching dc power supply as defined in claim 1, wherein the conduction initiator circuit comprises:

(a) a timing capacitor;

(b) a charging circuit connected to the timing capacitor for charging the same with a current of constant magnitude;

(c) a discharge switch connected in parallel with the timing capacitor, the discharge switch having a control terminal connected both to the switch control pulse generator circuit and to the mode selector circuit in order to discharge the timing capacitor both during the conducting periods of the voltage regulator switch and when the mode select signal is in the second state; and (d) a comparator having a first input connected to the timing capacitor, and a second input connected to a source of a reference voltage, for putting out the conduction initiator pulses when a voltage across the timing capacitor crosses the reference voltage.

5. A switching dc power supply as defined in claim 1, wherein the conduction initiator circuit comprises:

(a) a trigger circuit for generating a trigger pulse both at the end of each conducting period of the voltage regulator switch and at the end of the second state of the mode select signal;

(b) a timer connected to the trigger circuit for putting out a pulse upon lapse of a preassigned length of time after inputting each trigger pulse; and (c) an inhibit switch connected between the timer and the control pulse generator circuit for blocking an output pulse of the timer when the mode select signal is in the second state, passing the other output pulses of the timer as the conduction initiator pulses.

6. A switching dc power supply as defined in claim 1, wherein the mode selector circuit comprises:

(a) dual reference voltage source means for providing a first and a second reference voltage, the first reference voltage being less than the second reference voltage;

(b) a mode select comparator having a first input connected to the feedback circuit, and a second input connected to the reference voltage source means, for providing the mode select signal by comparing the feedback signal with the first or the second reference voltage; and (c) a reference voltage selector switch connected to the dual reference voltage source means for selectively delivering the first and the second reference voltage to the mode select comparator in response to the mode select signal from the mode select comparator, the reference voltage selector switch switching from the first to the second reference voltage when the feedback signal undershoots the first reference voltage, and from the second to the first reference voltage when the feedback signal overshoots the second reference voltage.

7. A switching dc power supply as defined in claim 6, wherein the mode selector circuit further comprises a complementary power supply circuit connected to the dual reference voltage source means for modifying the first and the second reference voltage according to the dc input voltage.

8. A switching dc power supply as defined in claim 1, wherein the mode selector circuit comprises:

(a) an input voltage detector circuit for providing an input voltage detect signal indicative of the dc input voltage;

(b) a complementary voltage generator circuit connected to the input voltage detector circuit for providing a complementary supply voltage which varies in inverse relationship to changes in the dc input voltage;

(c) a dual ratio voltage dividing circuit connected to the complementary voltage generator circuit for dividing the complementary supply voltage at either of a first and a second ratio for providing either of a first and a second reference voltage;

(d) a mode select comparator having a first input connected to the feedback circuit, and a second input connected to the dual ratio voltage dividing circuit, for providing the mode select signal by comparing the feedback signal with the first or the second reference voltage; and (e) a reference voltage selector switch connected to the dual ratio voltage dividing circuit for switching between the first and the second voltage dividing ratio in response to the mode select signal from the mode select comparator, in such a manner that the first reference voltage is delivered to the mode select comparator when the mode select signal is in the first state, and the second reference voltage when the mode select signal is in the second state.

9. A switching dc power supply as defined in claim 1, wherein the feedback circuit means comprises:

(a) first output means connected to the mode selector circuit for delivering thereto a first feedback signal which is inversely proportional to the dc output voltage; and (b) second output means connected to the conduction terminator circuit for delivering thereto a second feedback signal which is inversely proportional to the dc output voltage and which is less in magnitude than the first feedback signal.

* * * * *